Patented Apr. 29, 1952

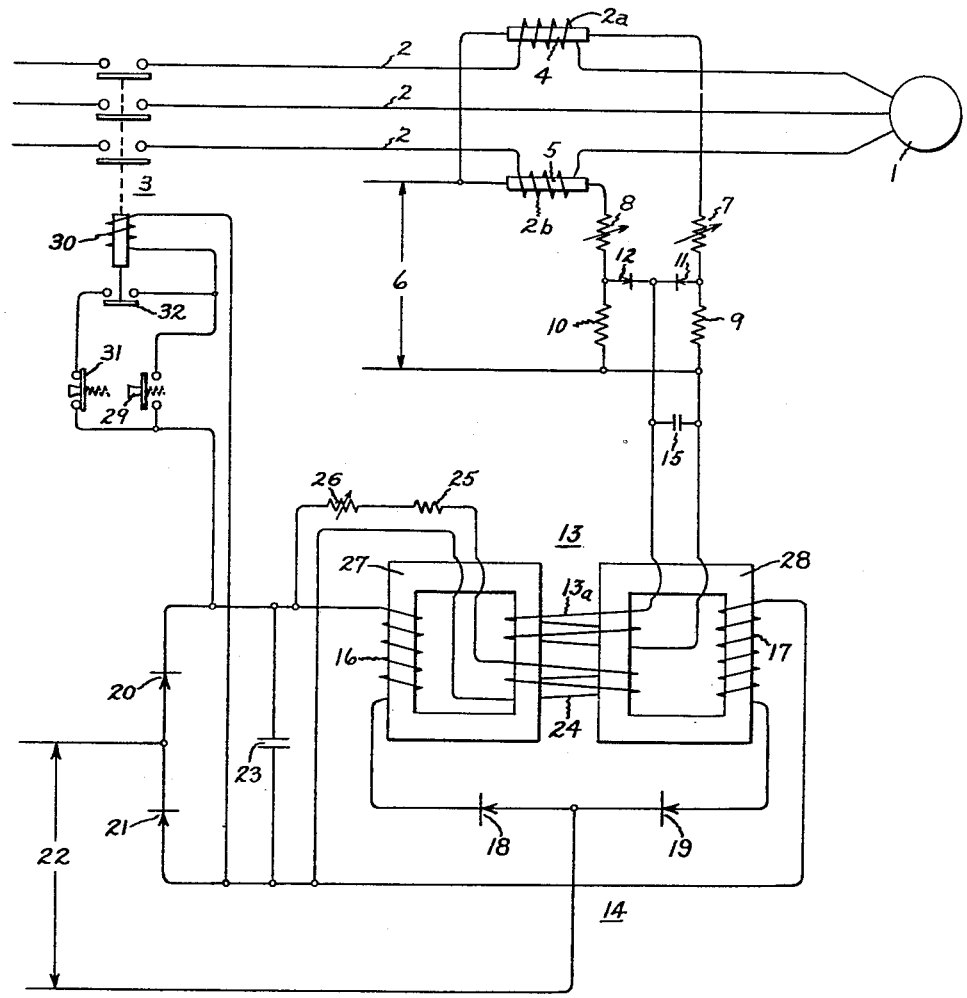

2,594,372

UNITED STATES PATENT OFFICE 2,594,372

SHOCK RESISTANT STATIC OVERLOAD RELAY

Vernon J. Wattenberger, Schenectady, N. Y., assignor to General Electric Company, a corporation of New York Application March 12, 1951, Serial No. 215,160

3 Claims. (Cl. 175—294)

My invention relates to relays and, more particularly, to overload static relays for the protection of electrical apparatus of frequency higher than 60 cycles and to be resistant to external mechanical shocks.

Such apparatus, in general, has less thermal mass than that designed for the usual 60 cycle apparatus of comparable rating and also the higher frequency results in a higher heating rate. In case of overload of a motor of 400 cycles, for example, the protective device must be capable of tripping out the current supply in 8 to 12 seconds, whereas the tripping device for a 60 cycle motor may be allowed 20 seconds or more to trip out the current supply without endangering its structure. An object of my invention, therefore, is to provide a quick-acting, shock-resistant overload static relay for the overload protection of equipment of higher than 60 cycle frequency.

Relays for the overload protection of electrical apparatus usually are provided with moving parts that control tripping mechanisms to disconnect the power source responsive to overload currents of a predetermined value. As current in the power lines increases, these moving parts progress to a tripping position so that at currents near the predetermined overload value, the mechanism is unstable and may be tripped by mechanical vibrations or shock. Another object of my invention is to provide a shock-resistant overload static relay to disconnnect an apparatus from its power source responsive to sustained overload currents of predetermined value and which is resistant to operation due to mechanical shock at values of overload current lower than the predetermined value.

In carrying out my invention in connection with a machine supplied by an operating source of power and having a solenoid switch connected between the machine and the operating power source, a rectifier bridge circuit is connected between the solenoid switch and a source of supply. The bridge circuit supplies a load circuit, including the coil of the solenoid switch and a capacitor connected in parallel therewith. The reactive windings of a saturable reactor are connected in adjacent arms of the bridge circuit to saturate the core of the reactor when current flows in the windings. When the core is saturated, an operating value of current is transmitted through the rectifier bridge to maintain the solenoid switch in closed position and when the reactor core is unsaturated, current flow to the solenoid coil is reduced below the operating value to open the switch. Hence, there are no moving parts in the relay operating the solenoid switch.

The reactor is provided with a D.-C. coil wound on the core which is polarized so that current flow in the coil induces flux in the core in the unsaturating direction. The D.-C. coil is connected in a voltage divider circuit which is connected between the leads of a signal power source. The voltage divider is provided with a pair of negative coefficient resistors adapted to be heated by current flowing to the machine to allow a flow of current through the D.-C. coil of a value high enough to unsaturate the reactor responsive to a sustained flow of current to the machine.

A serial connection between a feedback coil of the reactor and a variable feedback resistor is connected in parallel with the load member of the bridge circuit to provide a positive feedback circuit. When the voltage of the load begins to decrease, the feedback coil cooperates with the D.-C. coil to unsaturate the core of the reactor to provide rapid response to overload currents in the motor supply circuit. The feedback resistance may be varied to determine the value of current necessary to unsaturate the reactor.

For a better understanding of my invention, reference is made to the following description and the single figure of the accompanying drawing of one embodiment of my invention.

According to the drawing, the current to a motor 1 supplied by power lines 2 from an operating power source is controlled by a solenoid power switch 3. A pair of negative coefficient resistors 4 and 5 are positioned within coils 2a and 2b of resistance wire connected in series in lines 2 to be heated in response to the flow of current in lines 2. In applications with smaller motors, coils 2a may be connected in series in the supply lines 2 and in larger applications, coils 2a may be connected across shunts which are connected in series in lines 2. Negative coefficient resistors 4 and 5 are respectively connected to one lead of a signal source of A.-C. power 6 and in series with a pair of adjustable resistors 7 and 8 to form detecting elements. A pair of resistors 9 and 10 are respectively connected between resistors 7 and 8 and the other lead of source 6 and a pair of rectifiers 11 and 12 are respectively connected between resistors 7, 9 and 8, 10 and to one terminal of a D.-C. winding 13a of a saturable reactor 13. The other terminal of winding 13a is connected to the other lead of source 6 so that a voltage divider circuit is formed between the leads of source 6. A capacitor 15 is connected in parallel with winding 13a.

A magnetic amplifier 14 includes a pair of reactive windings 16 and 17 of saturable reactor 13 connected in series with a pair of rectifiers 18 and 19 to form adjacent arms of a rectifier bridge circuit of which the other two arms are formed by rectifiers 20 and 21 serially connected with the adjacent arms. The bridge is supplied from an A.-C. source 22 and is provided with load terminals having a capacitor 23 in shunt connection therewith. A serial connection between a D.-C. feedback winding 24 of the saturable reactor, a fixed resistance 25 and a variable feedback resistance 26 is connected in shunt with the load of the bridge to form a positive feedback circuit; i. e., winding 24 is polarized so that its flux is cumulative with the flux produced by D.-C. winding 13a. Windings 16 and 17 are respectively wound around core members 27 and 28 of the reactor which are formed in closed loops and D.-C. windings 13a and 24 of the reactor are wound around both of the core members.

The load circuit supplied by the rectifier bridge comprises a normally open push button switch 29 serially connected with an operating coil 30 of solenoid switch 3. When switch 29 is closed, the core of reactor 13 is saturated, due to flux from the unidirectional flow of current in windings 16 and 17, so that current flows in coil 30 of sufficient value to cause the armature of switch 3 to be picked up to close the switch. Switch 29 is connected in shunt connection with a sealing-in circuit including a normally closed push button switch 31 serially connected with normally open auxiliary contacts 32 of switch 3. When switch 3 is closed, a circuit is completed between the rectifier bridge and coil 30 through contacts 31 and contacts 32. The armature of switch 3 may be dropped out to open the switch by opening contacts 31.

Current flow in winding 13a is unidirectional due to rectifiers 11 and 12 and windings 13a and 24 are adapted so that currents flowing therein induce a flux in the core of reactor 13 that is opposite in direction to the saturating flux of windings 16 and 17.

Resistances 7 and 8 are adjusted so that at a predetermined value, which may be the minimum sustained current value that is harmful to motor 1, the detecting elements transmit a value of current to winding 13a sufficient to unsaturate reactor 13 and drop out the solenoid of switch 3, thus opening the switch.

The detecting elements are designed to have time constant properties matching those of motor 1 so that during momentary overloads, such as the starting current overloads required by motor 1, currents transmitted by the detecting elements are insufficient to unsaturate reactor 13.

As explained above, flux from currents in winding 24 also oppose the saturating flux of the core of reactor 13 to aid the currents in coil 13a to unsaturate reactor 13. Resistance 26 may be factory adjusted to determine the value of current in winding 13a necessary to cause switch 3 to open.

Relays of the character described in the foregoing specification have been built for application with apparatus operating at more than 60-cycle frequencies, for instance 400 cycles, in which the machines involved have small mass. These relays are capable of disconnecting a motor from its source in the fast time of 12 seconds and even this time can be reduced by changing the design characteristics of the component parts of the relay. For the more massive machines operating at 60 cycles, more time is allowable to disconnect the machine from the power source so that a less expensive disconnect device is usually preferable.

The mechanical shock resistant properties of a relay constructed according to the above specifications may be readily realized. Operation of the relay depends upon saturation of the core of reactor 13 to transmit operating current between the source and the load and upon increase in current flow in windings 13a and 24 to induce unsaturating flux in the core of reactor 13 to reduce the current transmitted below operating value. The saturation of the core of reactor 13 is independent of shock and the current increases occur in response to changes in electrical resistance properties of the material comprising thermistors 4 and 5 which are static and unaffected by vibrational shock.

While the particular embodiment of this invention is illustrated and described, modifications thereof will occur to those skilled in the art. I desire it to be understood, therefore, that this invention is not to be limited to the particular arrangement disclosed and I intend in the appended claims to cover all such modifications which do not depart from the spirit and scope of this application.

What I claim as new and desire to secure by Letters Patent of the United States is:

1. A shock resistant static overload relay comprising a rectifier bridge, a saturable reactor having a core and a pair of reactive windings respectively connected in adjacent arms of said rectifier bridge and wound upon said core to induce saturating flux therein when said relay is connected between a source of supply and a load to cause currents of operating value to flow in said load, a signal source, a voltage divider circuit including a D.-C. winding wound upon said core and polarized for flow of current therein to induce flux in said core to oppose said saturating flux, a negative coefficient resistor connected to one lead of said signal source, a fixed resistor connected between said negative coefficient resistor and the other lead of said signal source, a rectifier connected between said resistors, and to one terminal of said D.-C. coil, the other terminal of said D.-C. coil being connected to the other lead of said signal source and a detector coil wound around said negative coefficient resistor, said divider circuit being responsive to sustained flow of current in said detector coil above a predetermined value to cause a flow of current in said D.-C. coil to unsaturate said reactor and restrict the flow of current to said load to less than said operating value.

2. A shock resistant static overload relay for controlling the flow of current between a source of supply and a load comprising a rectifier bridge, a saturable reactor having a core and a pair of reactive windings respectively connected in adjacent arms of said rectifier bridge and wound upon said core to induce saturating flux therein when said rectifier bridge is connected between said supply and said load to cause currents of operating value to flow to said load, a source of signal power, a voltage divider circuit including a D.-C. winding wound upon said core and polarized for flow of current therein to induce flux in the unsaturating direction in said core, a negative coefficient resistor connected to one lead of said signal source, a variable resistor and a fixed resistor serially connected between said negative coefficient resistor and the other lead of said signal source, a rectifier connected at one terminal thereof between said variable and fixed resistors, said D.-C. coil being connected to the other terminal of said rectifier and to said other lead and a detector coil wound around said variable resistor, said voltage divider circuit being responsive to sustained currents in said detector coil in excess of a predetermined value to cause a flow of current in said D.-C. coil sufficient to unsaturate said reactor and restrict the flow of current to said load to less than said operating value.

3. A shock resistant static overload relay having load terminals for controlling the flow of current between a source of supply and a load comprising a rectifier bridge circuit connected between said terminals, a saturable reactor having a core including a pair of loop core members, a pair of reactive windings respectively wound on said core members and connected in adjacent arms of said rectifier bridge circuit to induce saturating flux in said core when said relay is connected between said source of supply and said load to allow a flow of current of operating value to said load, a source of signal current, a voltage divider circuit including a D.-C. winding wound on said core members and polarized for flow of current therein to induce flux in the unsaturating direction in said core, a pair of negative coefficient resistors connected to one lead of said signal source, a pair of variable detector resistors respectively connected to said negative coefficient resistors, a pair of detecting coils respectively wound on said negative coefficient resistors, a pair of fixed resistors respectively connected between said detector resistors and the other lead of said signal source, a pair of rectifiers respectively connected between said detector and said fixed resistors and to one terminal of said D.-C. winding, the other terminal of said D.-C. winding being connected to said other lead, a feedback winding and a variable feedback resistor serially connected between said load terminals, said feedback winding being wound on said core members and polarized for flow of current therein to induce flux in said unsaturating direction in said core, said voltage divider circuit being responsive to sustained currents in said detector coils above a predetermined value to allow a flow of current in said D.-C. coils to unsaturate said reactor and reduce the current to said load below said operating value, said detector resistor being variable to regulate the predetermined value of current in said detector coil at which said reactor is unsaturated and said feedback resistor being adjustable to determine the value of current required to unsaturate said reactor.

VERNON J. WATTENBERGER.

REFERENCES CITED

The following references are of record in the file of this patent:

UNITED STATES PATENTS

| Number | Name | Date |
|---|---|---|
| 2,377,506 | McWhirter et al. | June 5, 1945 |